United States Patent [19]

Vedder

[11] 4,234,884

[45] Nov. 18, 1980

[54] INK JET PRINTER ASSEMBLY AND ALIGNMENT OF PRINTER COMPONENTS

[75] Inventor: James L. Vedder, Dayton, Ohio

[73] Assignee: The Mead Corporation, Dayton, Ohio

[21] Appl. No.: 16,627

[22] Filed: Mar. 1, 1979

[51] Int. Cl.³ .............................................. G01D 15/18

[52] U.S. Cl. .................................. 346/75; 346/140 R

[58] Field of Search .............................. 346/75, 140 R

[56] References Cited

U.S. PATENT DOCUMENTS

| | | | |
|---|---|---|---|
| 3,701,998 | 10/1972 | Mathis | 346/75 |
| 3,805,273 | 4/1974 | Brady et al. | 346/75 |
| 4,081,804 | 3/1978 | Van Breeman et al. | 346/75 |

*Primary Examiner*—George H. Miller, Jr.

*Attorney, Agent, or Firm*—Biebel, French & Nauman

[57] ABSTRACT

An ink jet printer for generating a plurality of fluid jet drop streams includes a locating plate defining a plate receiving recess and an opening, within the recess, through the locating plate. A charge electrode plate is positioned within the plate receiving recess and defines a plurality of electrode openings therethrough which are lined with charge electrodes. Print data conductors are connected electrically to the charge electrodes for selectively supplying charge control signals to the electrodes. A print head means includes a fluid receiving reservoir and an orifice plate communicating therewith. The orifice plate defining a plurality of orifices from which fluid jet drop streams emerge. The print head means is mounted on the locating plate and positioned by a plurality of locating pins which extend from the print head means and are received within registration openings in the locating plate. A drop deflection electrode and drop catchers are also mounted on the locating plate. The locating plate provides a dimensional reference from which the respective positions of the other printer elements may be accurately set.

14 Claims, 12 Drawing Figures

INK JET PRINTER ASSEMBLY AND ALIGNMENT OF PRINTER COMPONENTS

BACKGROUND OF THE INVENTION

The present invention relates to ink jet printers and, more particularly, to a printer configuration which provides simple, accurate assembly and alignment of printer component elements. Ink jet printers of the type to which the present invention is directed generally comprise an orifice plate for forming one or more rows of liquid jets and a charge electrode plate provided with a series of charge electrode openings, aligned with the jets, for selectively charging fluid drops formed by the jets during formation of the drops. Such a printer also typically includes a deflection electrode arrangement for deflecting drops charged by the charge rings, and a catcher arrangement for catching drops which are so deflected. Non-deflected drops are deposited upon a moving print medium which is transported below the printer.

Ink jet printers of the above described type are inherently capable of high speed, high resolution printing, but have required close tolerance manufacture of printer elements and precise assembly of these elements. After use of such a printer for a substantial period of time, erosion of the orifice plate may occur and contaminants may be deposited in the fluid supply system. Accordingly, it may be necessary to disassemble the printer periodically for refurbishing the fluid supply system and thereafter reassembling the printer with the charge electrode apertures in precise alignment with the jet forming orifices in the orifice plate. Additionally, the deflection electrode arrangement and the catcher configuration may need to be cleaned or refurbished from time to time and these printer elements must thereafter be realigned precisely with the other elements of the printer. In the past, this has been a somewhat tedious process which is difficult for unskilled or semi-skilled operating personnel in a normal printing environment.

A typical printer arrangement is shown in U.S. Pat. No. 3,701,998, issued Oct. 31, 1972, to Mathis. The Mathis patent discloses a print head providing two rows of jets which is capable of solid print coverage across a print receiving web. Since the Mathis printer contemplates an extremely large number of very small diameter jets, providing a high level of resolution, accurate alignment between the orifice plate and the charge electrode plate in such a printer is critical.

In order to facilitate assembly and disassembly of jet drop printing elements of the type shown in the Mathis patent, U.S. Pat. No. 3,805,273, issued Apr. 16, 1974, to Brady et al. provided an improved mounting arrangement in which the fluidic elements, incorporated into an upper assembly, are segregated from the electrical elements, incorporated into a lower assembly. Such an arrangement provides for relatively easy disassembly of the printer to permit refurbishment of the printer elements. Reassembly of the Brady et al printer, however, is somewhat tedious because of the above mentioned requirement for precise alignment between the orifice plate and the charge ring plate.

U.S. Pat. No. 4,081,804, issued Mar. 28, 1978, to Van Breemen et al., discloses an ink jet printer having an upper assembly and a lower assembly with the orifice plate forming a part of the upper assembly and the charge electrode plate forming a part of the lower assembly. The lower assembly is adapted for mating with the upper assembly in a manner which facilitates alignment of the assemblies. Three precision steel balls are embedded in the charge electrode plate and are engaged by three corresponding rests extending downward from the upper assembly. The three rests respectively have conically-shaped, V-shaped, and flat surfaces for engaging the steel balls. The deflection electrode of the printer is mounted on the upper assembly, while the catcher structures are pivotally mounted on the support structure which also supports the charge electrode plate. While facilitating assembly and alignment of the printer elements, the arrangement of Van Breemen et al requires careful adjustment of the upper assembly rests and the other printer elements. Such adjustments are made more difficult by the fact that the printer elements are not dimensionally referenced from a single printer element structure.

Accordingly, it is seen that there is a need for a simple, easily assembled and aligned, ink jet printer in which the printer elements are aligned upon assembly without substantial adjustment difficulty and in which the printer elements are dimensionally referenced from a single printer element.

SUMMARY OF THE INVENTION

An ink jet printer for generating a plurality of fluid jet drop streams comprises a locating plate means defining a plate receiving recess and an opening within the recess through the locating plate means. A charge electrode plate is positioned in the locating recess and defines a plurality of electrode openings therethrough lined with charge electrodes. Print data conductors are connected electrically to the charge electrodes and supply charge control signals thereto. A print head means includes a fluid receiving reservoir and an orifice plate communicating therewith. The orifice plate defines a plurality of orifices through which fluid jet drop streams emerge. A plurality of locating pin means are mounted on the print head means and received within registration openings in the locating plate means. The locating pin means position the orifice plate with respect to the charge electrode plate such that each of the plurality of orifices is aligned with a respective one of the electrode openings defined by the charge electrode plate. Fluid drops in each jet stream are thereby selectively charged in correspondence with the charge control signals.

The plurality of locating pin means may comprise first and second locating pins which are mounted at opposite ends of the print head means and received within corresponding first and second registration openings in the locating plate means. The first and second locating pins may be substantially cylindrical, with the first registration opening being substantially cylindrical and the second registration opening being an elongated slot. The plurality of electrode openings may be positioned along a pair of parallel rows with the plurality of orifices positioned along a corresponding pair of parallel rows. In such an arrangement, the locating pins are positioned along a line parallel to and substantially intermediate the pair of rows of electrode openings.

The ink jet printer may further comprise a pair of drop catchers which are positioned below the locating plate means and outwardly of the pair of parallel rows of electrode openings. The drop catchers are pivotally mounted by an adjustable catcher mounting means on the locating plate means. Catcher retainer means are provided, mounted on the locating plate means, for engaging the drop catchers and retaining the catchers in positions adjacent the jet streams such that drops therefrom are selectively caught.

A drop deflection electrode may be positioned below the locating plate means, extending in a direction parallel to and intermediate the rows of jet drop streams. An electrical potential is provided between the drop deflection electrode and the drop catchers such that a drop deflecting electrical field is created therebetween. An adjustable deflection electrode mounting means mounts the deflection electrode on the locating plate means.

The deflection electrode may comprise a conductive ribbon and the adjustable deflection electrode mounting means may comprise a pair of mounting blocks. Each end of the conductive ribbon is engaged by one of the pair of mounting blocks. Each mounting block further includes a means for adjusting the position of the ribbon and for tensioning the ribbon.

A means for adjusting the spacing between the orifice plate and the charge electrode plate may include a plurality of threaded holes through the print head means and threaded members in the threaded holes extending from the print head means and contacting the locating plate means.

Accordingly, it is an object of the present invention to provide an ink jet printer in which the printer includes an upper assembly, having a fluid receiving reservoir and an orifice plate, and a lower assembly, having a charge electrode plate mounted in a locating plate means, with locating pins providing simple, accurate registration between the upper and lower assemblies; to provide such an ink jet printer in which the locating plate means defines a cylindrical opening and an elongated slot for receiving locating pins from the print head means; and to provide such an ink jet printer further including a catcher arrangement and a deflection electrode which are adjustably mounted on the locating plate means.

Other objects and advantages of the invention will be apparent from the following description, the accompanying drawings and the appended claims.

DETAILED DESCRIPTION OF THE PREFERRED EMBODIMENT

Figure 1:
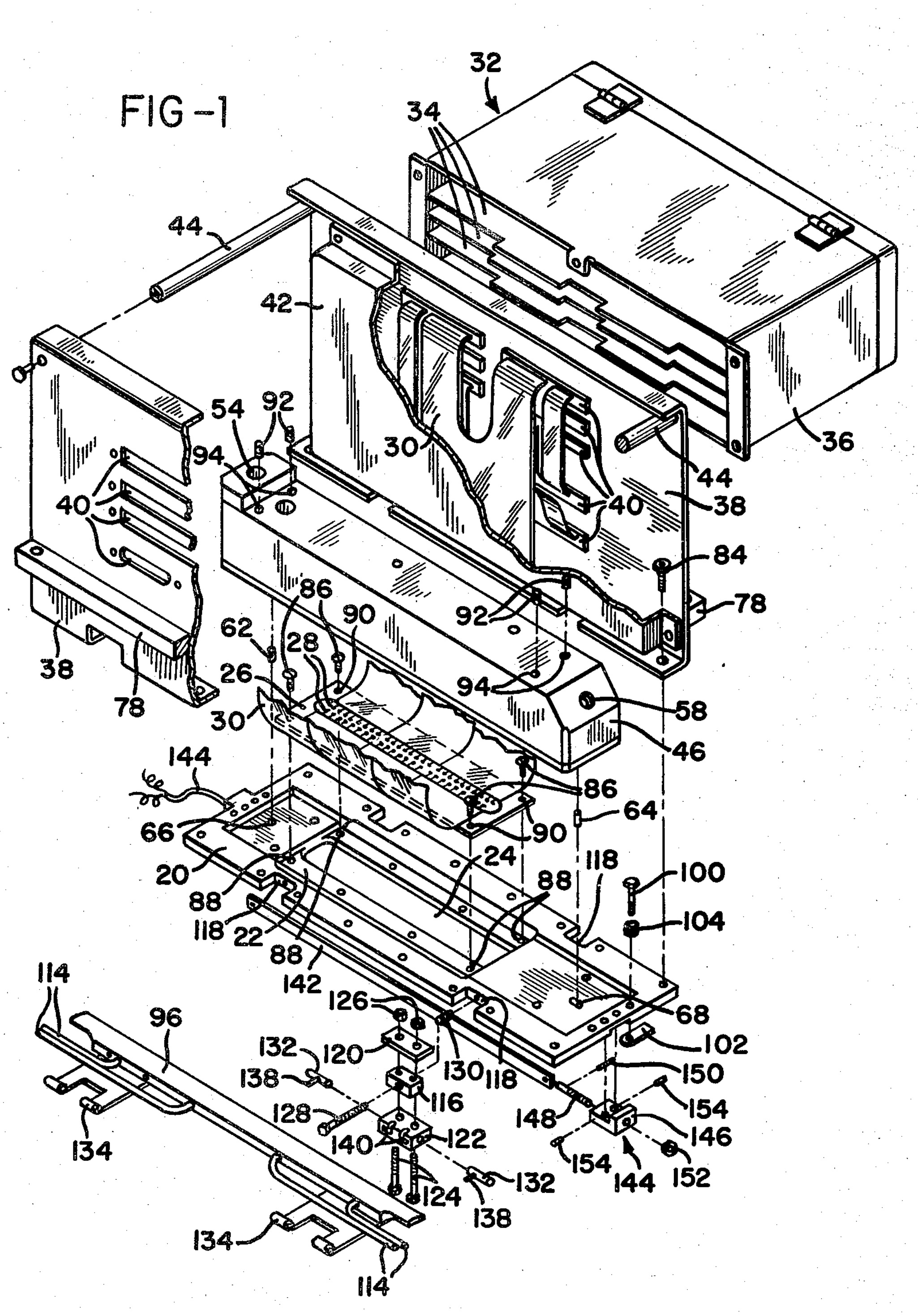
FIG. 1 is an exploded perspective view, with portions broken away, showing the ink jet printer of the present invention.

Reference is made to FIG. 1, an exploded perspective view with portions broken away, which illustrates the ink jet printer of the present invention. A locating plate means 20 defines a plate receiving recess 22 and an opening 24 within the recess 22 which extends completely through the plate 20. Charge electrode plate 26 is positioned in locating recess 22 and defines a plurality of electrode openings 28 therethrough which are lined with electrically conductive charge electrodes. Electrode openings 28 are positioned along a pair of parallel rows.

Print data conductors 30, connected electrically to charge electrodes 28, supply charge control signals to the charge electrodes 28 from print control circuitry 32 which is mounted on circuit boards 34 in cabinets 36. Print data conductors 30 may take the form of flat conductor cables, each of which includes a plurality of conductors. The conductors 30 are connected to associated printed circuit conductors on the charge electrode plate 26, with each printed circuit conductor providing connection to a respective one of the charge electrodes 28. Cabinets 36 are mounted on the exterior of printer cabinet 38, with the conductors 30 extending through slots 40 therein. Baffles 42 cover the conductors 30 as they extend down the inner walls of cabinet 38. Spacer bars 44 extend between the side walls of cabinet 38 and provide structural support therefor.

Figures 3, 5, 8, 9, 10:
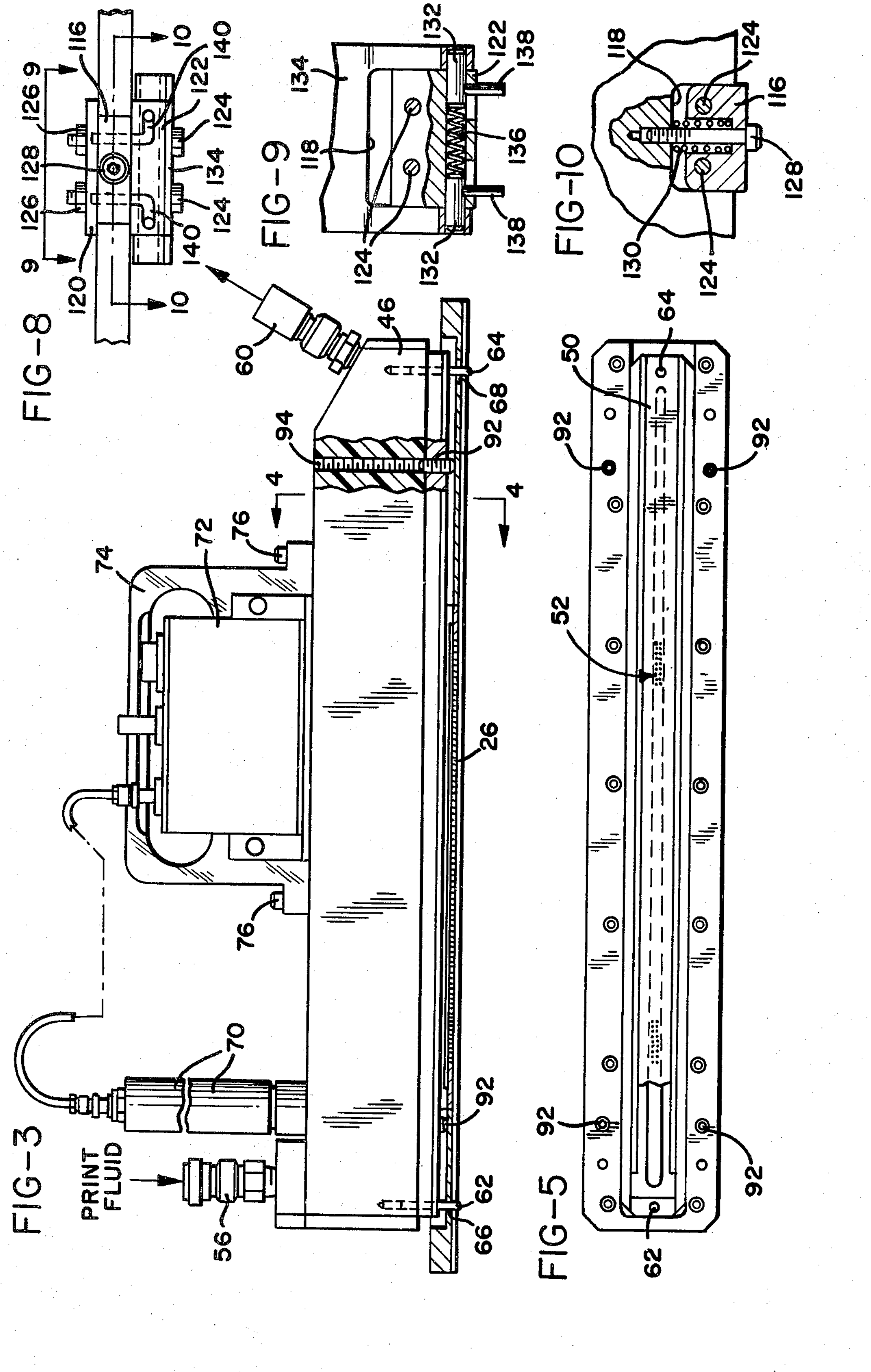
FIG. 3 is a front view of the print head means, the charge electrode plate, and the locating plate means, with portions broken away and in section.
FIG. 5 is a bottom view of the print head means.
FIG. 8 is an enlarged view, taken generally along line 8—8 in FIG. 6, illustrating the adjustable catcher mounting means.
FIG. 9 is a sectional view of the adjustable catcher mounting means taken generally along line 9—9 in FIG. 8.
FIG. 10 is a sectional view of the adjustable catcher mounting means, taken generally along line 10—10 in FIG. 8.

A print head means 46 defines a fluid receiving reservoir 48 (FIG. 4) and includes an orifice plate 50 communicating therewith. Orifice plate 50 defines a plurality of orifices 52 which communicate with the reservoir 48 and through which fluid jet drop streams emerge during operation of the printer. As seen in FIG. 5, the orifices 52 are positioned along a pair of parallel rows. When the printer is properly assembled, the rows of orifices 52 are in substantial registration with the rows of electrode openings 28 such that the drops in the jet drop streams emerging from the orifices 52 are selectively charged by the charge control signals applied to the electrodes 28 as the drop streams pass through the respective electrode openings.

Print fluid is supplied to the fluid reservoir 48 under pressure via opening 54 in the top of the print head means 46. Fitting 56 (FIG. 3) in opening 54 provides a connection to a fluid supply system (not shown). Opening 58 also communicates with the fluid receiving reservoir 48 and, via fitting 60, provides a fluid outlet from the reservoir 48 which permits to be flushed from the print head means 46. As seen in FIGS. 3 and 5, a plurality of locating pin means, including locating pins 62 and 64, are mounted on the print head means 46 and are received within registration openings 66 and 68, respectively, in the locating plate means 20. Pins 62 and 68 thereby position the orifice plate 50 with respect to the charge electrode plate 26 such that each of the plurality of orifices 52 is aligned with a respective one of the electrode openings 28 defined by the charge electrode plate 26.

In order to improve the uniformity of drop formation in the jets which issue from the orifices 52, an electromechanical stimulator 70 of conventional design is mounted on the print head means 46 and extends through the fluid receiving reservoir 48 in contact with the orifice plate 50. In a known manner, stimulator 70 induces bending waves in orifice plate 50, which waves travel along the rows of jets, producing pressure varicosities in the jets and break up of the jets into drops of substantially uniform size and spacing. The stimulator 70 may be of the type which includes one or more piezoelectric crystal elements which are electrically stimulated to produce mechanical vibration at a desired frequency. Stimulator generator 72 is mounted on the print head means 46, as shown in FIG. 3, to produce the necessary electrical stimulation signals for application to stimulator 70. Print head handle 74, also mounted on the print head means 46 by bolts 76, enables the print means to be removed easily from the printer.

Figure 2:
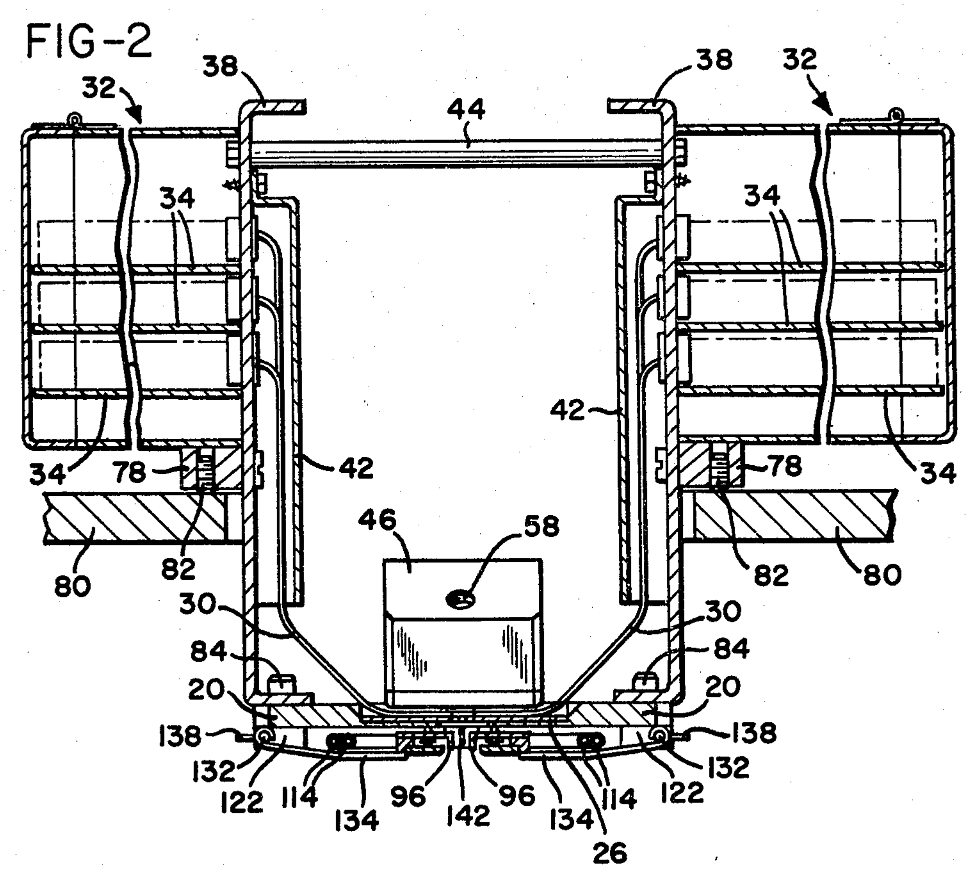
FIG. 2 is an end view of the printer with portions in section as seen looking generally from right to left in FIG. 1.

As seen in FIGS. 1 and 2, the side panels of cabinet 38 include support strips 78 which provide a means of supporting the printer on a support plate 80. Threaded screws 82, received in threaded openings in the support strips 78, provide a means for leveling the printer. The printer cabinet 38 is attached to the locating plate means 20 by threaded screws 84. Although not illustrated in the drawings, top and end cabinet panels are provided for completely enclosing the print head means within the cabinet.

Figure 6:
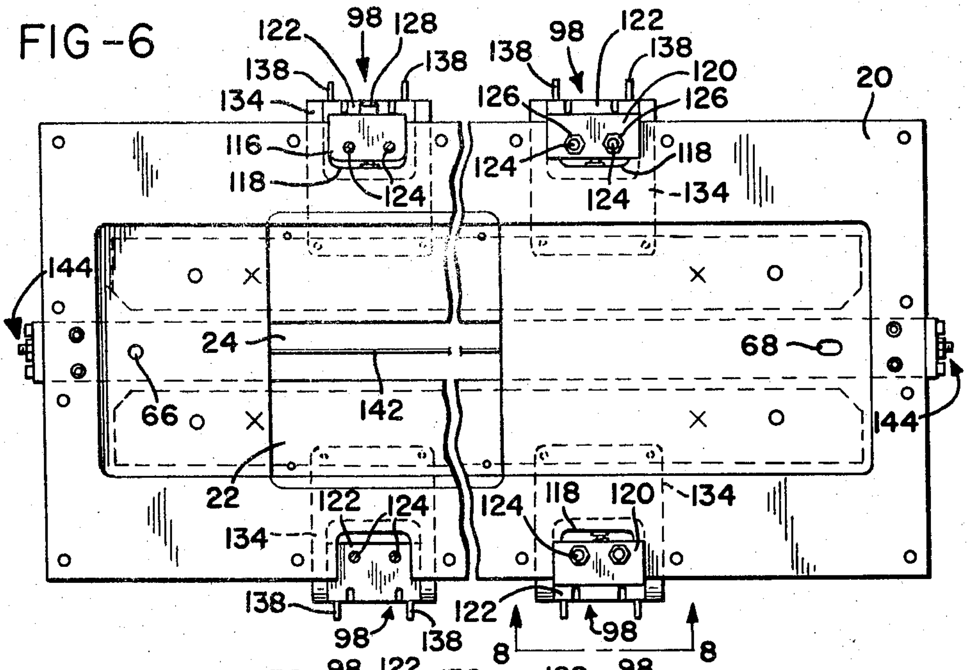
FIG. 6 is a plan view of the locating plate means, illustrating the manner in which the deflection electrode and the catchers are mounted thereon.

As seen most clearly in FIG. 6, the first registration opening 66 in the locating plate means 20 is substantially cylindrical in shape while the second registration opening 68 defines an elongated slot. Registration opening 66 and locating pin 62 define a precise reference point from which the appropriate location of all of the printer elements are accurately referenced. The position of pin 62 in the print head means 46 is precisely located with respect to the orifices 52 in the orifice plate 50. Similarly, the positions of the charge electrode openings 28 defined by charge electrode plate 26 are set precisely with respect to the registration opening 66. Locating pins 62 and 64 are positioned along a line which is parallel to and substantially intermediate the pair of rows of electrode openings.

Plate 26 is mounted within the recess 22 by means of threaded bolts 86 (FIG. 1) which engage threaded openings 88 in locating plate means 20. Since openings 90 through which bolts 86 extend in the charge electrode plate 26 are substantially larger than threaded bolts 86, precise positioning of the charge electrode openings 28 with respect to the first registration opening 66 may be easily obtained. Locating pin 64 and associated registration opening 68 ensure that the print head means 46 is positioned such that the pair of rows of electrode openings 28 are substantially parallel to the pair of rows of orifices in orifice plate 50. The jet drop streams emerging from the orifices 52 in plate 50 therefore pass through the charge electrode openings 28 and are selectively charged.

As discussed in the above-identified Mathis patent, as the print fluid in reservoir 48 emerges through each orifice 52, it forms an elongated fluid filament. Drops of fluid periodically break off from the tip of the fluid filament, with this drop formation being made more uniform by the bending waves traveling along the orifice plate 50. To charge selectively each of the drops, a charge electrode, which in the presently disclosed printer comprises a conductive charge electrode lining an opening in the charge electrode plate 26, is positioned near the tip of the fluid filament.

With charge electrodes of the type disclosed herein, it is preferable that the fluid filament extend into the ring-shaped electrode, with drop formation occurring within the electrode opening 28. An electrostatic potential is placed on the charge electrode when it is desired to charge a drop being formed. Since the print fluid is conductive, a corresponding charge of opposite polarity is induced on the tip of the fluid filament. This charge is carried away by the charged drop.

It will be appreciated, therefore, that it is desirable that the charge electrode plate 26 be positioned below the orifice plate 50 by a distance corresponding generally to the length of the fluid filaments which emerge from the orifices 52. Accordingly, a means for adjusting the spacing between the orifice plate 50 and the charge electrode plate 26 is provided, including threaded members 92 which are positioned in threaded holes 94 in the print head means 46. The spacing between plates 50 and 26 is set between 0.01 and 0.03 inches in a typical printer.

If desired, the print head means 46 can be positioned further from the charge electrode plate 26 at the end of the print head means furthest from the stimulator 70. This may be desirable since the lengths of the fluid filaments tend to be inversely related to the amplitude of bending wave stimulation and this amplitude is reduced through attenuation as the bending waves travel along the length of the orifice plate 50.

Figure 4:
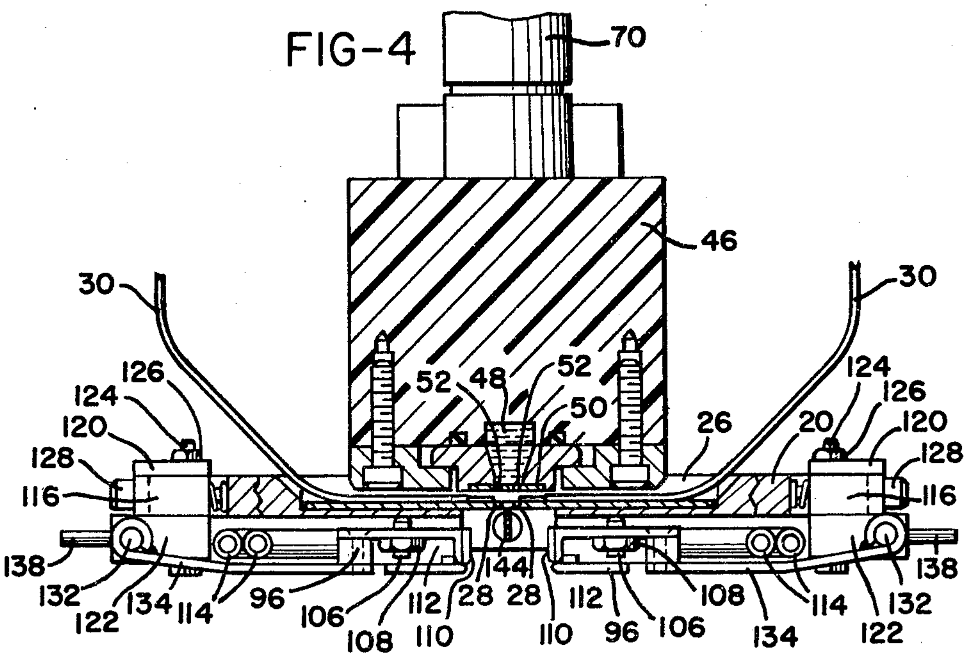
FIG. 4 is a sectional view of the print head means, taken generally along line 4—4 in FIG. 3, with the catcher structure and the deflection electrode added but with the stimulator generator and print head handle removed.
Figure 7:
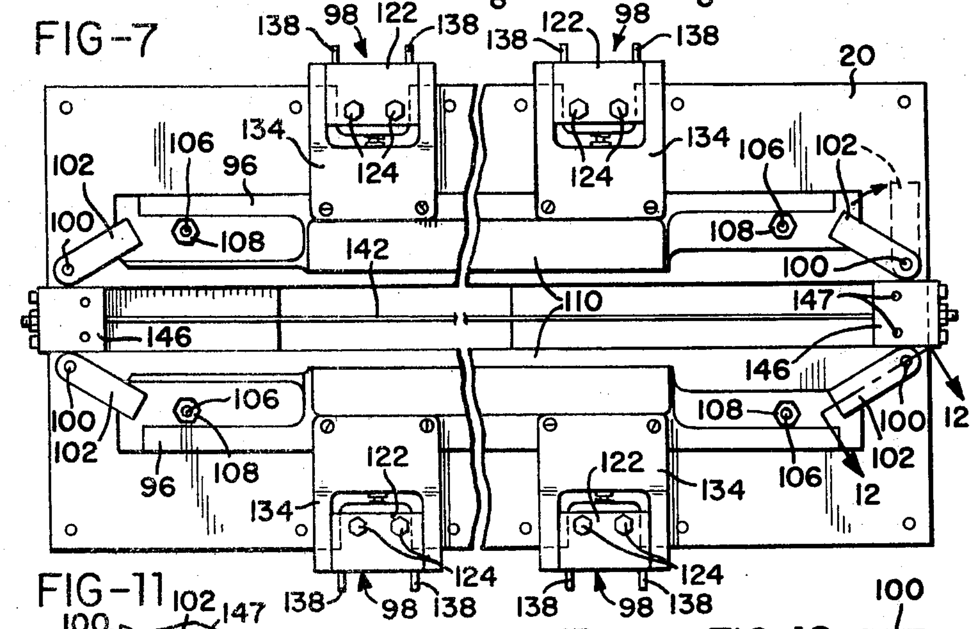
FIG. 7 is a bottom view of the ink jet printer.
Figure 12:
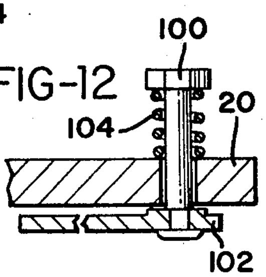
FIG. 12 is a sectional view, taken generally along line 12—12 in FIG. 7, illustrating the catcher retainer means.

As seen in FIGS. 1, 6 and 7, the ink jet printer of the present invention further comprises a pair of drop catchers 96 which are positioned below the locating plate means 20 and outwardly of the pair of parallel rows of the electrode openings 28. Only one such catcher is shown in FIG. 1, for clarity. Catchers 96 are pivotally mounted on the locating plate means 20 by adjustable catcher mounting means 98. The hinge arrangement by which the catchers 96 are mounted on the plate 20 permits the catchers 96 to be pivoted downwardly and outwardly from the plate 20 to facilitate servicing of the printer. Each of the catchers 96 is retained in its respective position adjacent the jet drop streams for catching the selectively charged drops therein by means of a pair of catcher retainer means. As seen in FIG. 12, each such catcher retainer means includes a pin 100 which extends through an opening in the plate 20 and engages retainer 102. The pin 100 is urged upwardly by spring 104 and, when pivoted into contact with the bottom surface of associated catcher 96 as shown in FIG. 7, biases the catcher 96 upward into an appropriate position adjacent the jet drop streams. As seen in FIG. 4, threaded bolts 106 and locking nuts 108 limit the upward movement of the catchers 96, thereby ensuring that the catchers 96 are properly positioned vertically.

Each catcher defines a vertical drop catching surface 110 which is struck by appropriately charged drops. The drops flow down the surfaces 110 and are ingested into catcher cavities 112 in which partial vacuums are maintained by connection of vacuum lines 114 to an appropriate vacuum source, such as a vacuum pump.

The adjustable catcher mounting means 98 each includes a position block 116 which is received into a notch 118 in the edge of the locating plate means 20. Positioning block 116 is held in place by plate 120 and hinge support plate 122 which are drawn together by bolts 124 and nuts 126. Prior to tightening nuts 126, position blocks 116 are positioned by means of threaded bolts 128 which hold the blocks 116 in position against the outward force applied to the blocks by springs 130.

Hinge blocks 122 receive hinge pins 132 which extend outwardly to engage hinges 134 mounted on catchers 96. In order to remove catchers 96 from the printer as for cleaning or replacement, hinge pins 132 are retracted inwardly against the force of springs 136 by means of pin members 138 which slide in L-shaped slots 140. Pin members 138 may be rotated upward in the slots 140 to hold the hinge pins 132 in their retracted positions.

The printer of the present invention further includes a drop deflection electrode 142 which is positioned below the locating plate means 20 and extends in a direction parallel to and intermediate the rows of jet drop streams formed by the orifices 52. Electrical connector 144 (FIG. 1) connects the deflection electrode 142, which may take the form of a conductive ribbon, to an electrical potential source such that a potential is provided between the drop deflection electrode 142 and the drop catchers 26. Such an arrangement creates a drop deflecting electric field between the electrode 142 and the catchers 96, whereby charged drops in the jet drop streams are deflected to strike the catchers 96.

The deflection electrode 142 is mounted on the locating plate 20 by an adjustable deflection electrode mounting means 144. Mounting means 144 comprises a pair of mounting blocks 146 with one of the pair of blocks 146 engaging each end of the conductive ribbon 142. Mounting blocks 146 are mounted on plate 20 by threaded bolts 147.

Figure 11:
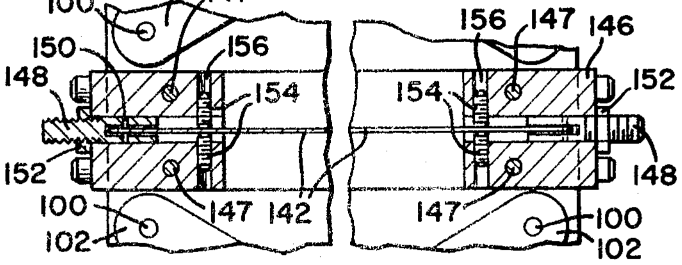
FIG. 11 is an enlarged view similar to FIG. 7, with portions of the adjustable deflection electrode mounting means broken away and in section, illustrating the manner in which the deflection electrode is mounted.

As seen in FIG. 11, the deflection electrode mounting means further comprise means for adjusting the position of the ribbon 142 and means for tensioning the ribbon 142. Threaded rods 148 are received within openings in mounting blocks 146. Each rod 148 defines a slot in which is received an end of ribbon 142. Pins 150 extend across the slot through ribbon 142 and rods 148, providing for secure engagement of the ribbon 142 by the rod 148. Nuts 152 engage the outer ends of rods 148 and provide a means of tensioning the ribbon 142. Lateral adjustment of the ribbon 142 is provided by adjusting screws 154 in transverse threaded openings 156, ensuring that the ribbon 142 extends parallel and substantially intermediate the rows of jet drop streams.

It will be appreciated, therefore, that the unique construction of the present invention facilitates assembly and disassembly of the printer elements with a minimum amount of effort being required for proper positioning of the elements. The print head means is aligned with the charge electrode plate by the locating pins extending into the registration openings defined by the locating plate means. Similarly, the other major printer elements, the catchers and the deflection electrode, are also mounted on the locating plate means. Thus the locating plate means and the registration openings therein provide a dimensional reference from which the respective positions of the other printer elements may be accurately set.

While the form of apparatus herein described constitutes a preferred embodiment of the invention, it is to be understood that the invention is not limited to this precise form of apparatus, and that changes may be made therein without departing from the scope of the invention.

What is claimed is:

1. An ink jet printer for generating a plurality of fluid jet drop streams, comprising:

locating plate means defining a plate receiving recess and an opening within said recess through said locating plate means, charge electrode plate positioned in said plate receiving recess and defining a plurality of electrode openings therethrough lined with charge electrodes, print data conductors, connected electrically to said charge electrodes, for selectively supplying charge control signals thereto, print head means including a fluid receiving reservoir and an orifice plate communicating therewith, said orifice plate defining a plurality of orifices from which fluid jet drop streams emerge, a plurality of locating pin means, mounted on said print head means and received within registration openings in said locating plate means, for positioning said orifice plate with respect to said charge electrode plate such that each of said plurality of orifices is aligned with a respective one of said electrode openings defined by said charge electrode plate, whereby fluid drops in each jet stream are selectively charged in correspondence with said charge control signals.

2. The ink jet printer of claim 1 further comprising a printer cabinet surrounding said print head means and attached to said locating plate means.

3. The ink jet printer of claim 1, further comprising means for adjusting the spacing between said orifice plate and said charge electrode plate.

4. The ink jet printer of claim 3 in which said means for adjusting the spacing between said orifice plate and said locating plate means comprises means in said print head means defining a plurality of threaded holes therethrough and threaded members in said threaded holes, extending from said print head means and contacting said locating plate means.

5. The ink jet printer of claim 1 in which said plurality of locating pin means comprise first and second locating pins, mounted at opposite ends of said print head means and received within corresponding first and second registration openings in said locating plate means.

6. The ink jet printer of claim 5 in which said first and second locating pins are substantially cylindrical, and in which said first registration opening is substantially cylindrical and said second registration opening is an elongated slot.

7. The ink jet printer of claim 6 in which said plurality of electrode openings are positioned along a pair of parallel rows and in which said plurality of orifices are positioned along a pair of parallel rows, said pair of rows of said orifices being in substantial registration with said pair of rows of said electrode openings, whereby two parallel rows of jet drop streams are formed and selectively charged.

8. The ink jet printer of claim 7 in which locating pins are positioned along a line parallel to and substantially intermediate said pair of rows of said electrode openings.

9. The ink jet printer of claim 8 in which said second registration opening is elongated in a direction substantially parallel to said line along which said locating pins are positioned.

10. The ink jet printer of claim 7 further comprising a pair of drop catchers positioned below said locating plate means, outwardly of said pair of parallel rows of electrode openings, and adjustable catcher mounting means for pivotally mounting said catchers on said locating plate means.

11. The ink jet printer of claim 10 further comprising catcher retainer means, mounted on said locating plate means, for engaging said drop catchers and retaining said catchers in positions adjacent said jet drop streams such that drops therefrom are selectively caught.

12. The ink jet printer of claim 10 further comprising:

a drop deflection electrode positioned below said locating plate means and extending in a direction parallel to and intermediate to said rows of jet drop streams, and means for providing an electrical potential between said drop deflection electrode and said drop catchers such that a drop deflecting electrical field is created therebetween, whereby charged ones of said drops in said jet drop streams are deflected to strike said catchers.

13. The ink jet printer of claim 12, further comprising adjustable deflection electrode mounting means for adjustably mounting said deflection electrode on said locating plate means.

14. The ink jet printer of claim 13 in which said deflection electrode comprises a conductive ribbon and in which said adjustable deflection electrode mounting means comprises a pair of mounting blocks, one of said pair of mounting blocks engaging each end of said conductive ribbon and including means for adjusting the position of said ribbon and means for tensioning said ribbon.

* * * * *